United States Patent Office 3,250,057
Patented May 10, 1966

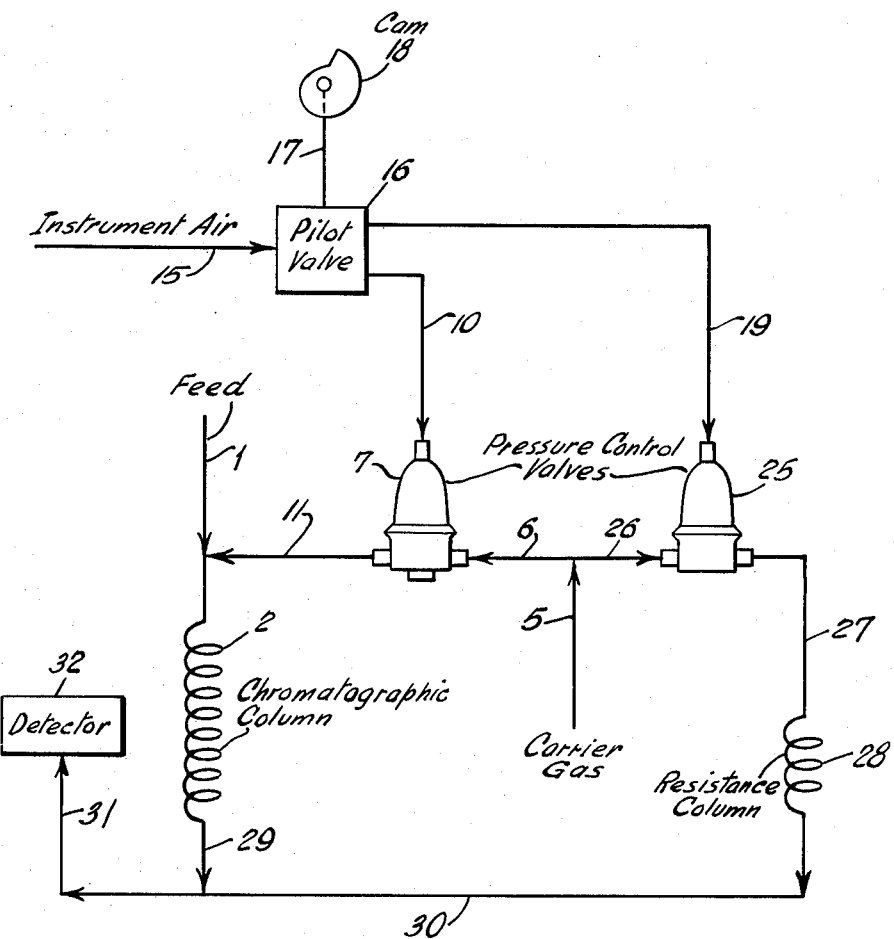

3,250,057
CHROMATOGRAPHIC SEPARATION OF
GASEOUS MIXTURES
Stanley A. Clarke, Pointe-a-Pierre, Trinidad, assignor to
Texaco Trinidad, Inc., Pointe-a-Pierre, Trinidad, a corporation of Delaware
Filed Apr. 2, 1963, Ser. No. 270,052
Claims priority, application Trinidad, Mar. 13, 1963,
18/63
2 Claims. (Cl. 55—67)

This invention relates to an improved method for the separation of volatile mixtures. More particularly, it relates to a chromatographic separation of volatile mixtures wherein the pressure of the carrier gas is varied during the period in which the mixture is separated into its components. In accordance with this method of separation, a volatile mixture is introduced into a chromatographic column, a flow of carrier gas is passed through said column for a period of time separating said mixture into its components and the pressure of the chromatographic column is varied during the period of time in which said separation is effected.

Chromatography is a rapid, sensitive and versatile method of separating volatile mixtures into their constituents. Chromatographic separation may be applied to liquid mixtures simply by vaporizing the liquid. In chromatographic separation, a portion of the mixture is introduced as a plug into a chromatographic column. The column may contain a solid or liquid sorbent. In one form of chromatographic column, referred to as a capillary column, the column comprises an elongated tube of small internal diameter in which a stationary liquid phase is coated on the inner wall. After introduction of a plug or portion of mixture into the chromatographic column, a flow of carrier gas is maintained which moves the mixture toward the outlet of the column. As the mixture moves through the column, differences in the partition coefficients of the constituents of the mixture cause the mixture to separate into bands. These bands are then eluted from the column one after another in the increasing order of their partition coefficients. The elution of each band and the quality of a constituent in a band is determined by passing the carrier gas and eluted constituents to a detector. The signal from the detector may be recorded forming a chart or chromatogram. Each constituent of the gaseous mixture appears as a peak. The appearance time, height, width, and area of these peaks provides qualitative and quantitative analytical data. Quantities of the pure components may be recovered by separately collecting the material eluted in each peak.

In the chromatographic analysis of wide boiling range mixtures, the more volatile components appear as early, closely spaced and poorly resolved peaks. The less volatile components appear more widely spaced and the peaks are broadened. One method which has been used to improve the separation of wide boiling range mixtures is temperature programming, that is, changing the temperature of the column during the separation. The method of temperature programming, however, has several disadvantages. For example, at the end of a chromatogram, the entire apparatus must be cooled to the starting temperature before another cycle can be begun. Considerable difficulty is encountered in controlling the temperature of large or long chromatographic columns due to the lag of heating and the difficulty of achieving uniform heating.

An object of this invention is to provide a method of obtaining chromatographic separation of wide boiling range mixtures or mixtures of constituents having widely different partition coefficients. An advantage of this invention is that chromatographic separation may be obtained with peaks of equal widths for equal theoretical plate values. Another advantage is that the calculation of analytical data may be simplified. Another advantage of this invention is that in the analysis of homologous series, the peaks, notably those due to the higher members, become more nearly linearly spaced thus aiding identification by extrapolation. This method is useful in the automation of processes in which analysis is the controlling feature since pressure programming is in itself susceptible to automation. Pressure programmed chromatography is particularly useful in the automation of process control since the pressure responds quickly and precisely with no time lag as encountered with temperature programming. Pressure programming is highly advantageous with large scale apparatus for the separation of useful quantities of the constituents of mixtures or with long chromatographic columns since the apparatus for the control of pressure is virtually independent of the size of the equipment whereas facilities to control temperature must be expanded with the size of the equipment.

In accordance with the method of this invention, the pressure of the chromatographic column is increased progressively during the course of the chromatogram. Conveniently when employing capillary chromatographic columns, the inlet pressure is increased progressively while the column exit pressure remains constant at atmospheric.

The invention will be best understood by reference to the drawing and following description of the invention. Although the drawing illustrates one form of apparatus in which the invention may be practiced, it is not intended to limit the invention to the particular apparatus or material described.

In an example of the application of this invention to the analysis of a hydrocarbon mixture, reference is made to the accompanying drawing. A sample of the mixture is evaporated into feed line 1 and introduced into chromatographic column 2. Nitrogen carrier gas at a supply pressure of 35 pounds per square inch gauge in line 5 is passed through line 6 to pressure control valve 7. Control valve 7 is adjusted by instrument air in line 10 to supply carrier gas through line 11 to chromatographic column 2. Control air from an instrument air supply line 15 is supplied to line 10 through pilot valve 16. Pilot valve 16 is operated by lever 17 and cam 18. Cam 18 is turned by a geared electric motor (not shown) at a shaft speed of ⅓ revolution per hour. Cam 18, rod 17 and pilot valve 16 are adjusted so that the complete stroke of rod 17 on pilot valve 16 results in the air output pressure in line 10 ranging from 3 to 15 pounds per square inch gauge. Simultaneously and correspondingly, control air is supplied to line 19 at a pressure ranging from 15 to 3 pounds per square inch gauge. Instrument air supply 19 actuates pressure control valve 25 which admits carrier gas from line 26 through line 27 to resistance column 28. Chromatographic column 2 discharges through line 29 and resistance column 28 discharges through line 30. Lines 29 and 30 are connected and discharge through line 31 to detector 32. As the flow to detector 32 continues, successive peaks are measured corresponding to the quantity of each of the constituents of the hydrocarbon mixture present in the original mixture.

I claim:
1. In a method for separating the components of a gaseous mixture wherein said mixture is introduced into a capillary chromatographic column, a flow of carrier gas is passed through said column for a period of time separating said mixture into its components, and effluent gas comprising carrier gas and separated components is passed to a detector at substantially atmospheric pressure, the improvement which comprises:
continuously progressively increasing the pressure of the carrier gas introduced into said capillary chromatographic column during said period to continuously progressively increase said flow of carrier gas, and mixing a separate stream of carrier gas with said effluent gas passed to said detector in correspondingly decreased amounts to maintain the total flow of gas to the said detector at a constant rate during said period.

2. In a method for separating the components of a gaseous mixture wherein said mixture is introduced into a capillary chromatographic column, a flow of a carrier gas is passed through said column for a period of time separating said mixture into its components, and effluent gas comprising carrier gas and separated components is passed to a detector at substantially atmospheric pressure, the improvement which comprises:

continuously progressively increasing the pressure of the carrier gas introduced into said capillary chromatographic column during said period to continuously progressively increase said flow of carrier gas, passing a separate stream of carrier gas through a capillary resistance tubing, admixing said separate stream of carrier gas with said effluent gas passed to said detector, and decreasing the pressure of said separate carrier gas stream introduced into said capillary resistance tubing in proportion to the increases in pressure of said capillary chromatographic column to maintain constant the flow rate of the combined stream of said separate stream of carrier gas and said effluent gas.

References Cited by the Examiner

UNITED STATES PATENTS

| | | | |
|---|---|---|---|
| 3,056,277 | 10/1962 | Brenner | 55—67 |
| 3,120,749 | 2/1964 | Paglis et al. | 73—231 |
| 3,134,257 | 5/1964 | Reinecke | 73—231 |

FOREIGN PATENTS

| | | |
|---|---|---|
| 1,299,684 | 6/1962 | France. |
| 978,019 | 12/1964 | Great Britain. |

OTHER REFERENCES

Giddings, J. C.: Retention Times in Programmed Temperature Gas Chromatography, in Journal of Chromatography (1960), vol. 4, p. 19.

SAMIH N. ZAHARNA, *Primary Examiner.*

REUBEN FRIEDMAN, *Examiner.*

B. NOZICK, *Assistant Examiner.*